US 9,860,814 B2

(12) United States Patent
Tejedor et al.

(10) Patent No.: US 9,860,814 B2
(45) Date of Patent: Jan. 2, 2018

(54) METHOD AND ARRANGEMENT IN A TELECOMMUNICATION SYSTEM

(71) Applicant: Telefonaktiebolaget LM Ericsson (publ), Stockholm (SE)

(72) Inventors: Erika Tejedor, Stockholm (SE); Asif Ali Khan, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 46 days.

(21) Appl. No.: 15/036,383

(22) PCT Filed: Jul. 2, 2014

(86) PCT No.: PCT/SE2014/050833
§ 371 (c)(1),
(2) Date: May 12, 2016

(87) PCT Pub. No.: WO2015/072903
PCT Pub. Date: May 21, 2015

(65) Prior Publication Data
US 2016/0302125 A1 Oct. 13, 2016

Related U.S. Application Data

(60) Provisional application No. 61/903,452, filed on Nov. 13, 2013.

(51) Int. Cl.
*H04W 36/20* (2009.01)
*H04W 16/14* (2009.01)
(Continued)

(52) U.S. Cl.
CPC .......... *H04W 36/20* (2013.01); *H04B 17/318* (2015.01); *H04L 1/00* (2013.01);
(Continued)

(58) Field of Classification Search
CPC ... H04W 36/20; H04W 36/08; H04W 72/082; H04W 52/244; H04W 16/14;
(Continued)

(56) References Cited

U.S. PATENT DOCUMENTS 8,837,301 B2 * 9/2014 Krishnamurthy ..... H04L 1/0026
370/242
9,408,121 B2 * 8/2016 Xiao ................. H04W 36/0088
9,622,138 B2 * 4/2017 Bontu ............... H04W 36/0094

FOREIGN PATENT DOCUMENTS

EP 2469910 A1 6/2012
WO 2011159988 A1 12/2011
(Continued)

OTHER PUBLICATIONS

3GPP, "3rd Generation Partnership Project; Technical Specification Group Radio Access Network; Evolved Universal Terrestrial Radio Access (E-UTRA); Physical layer; Measurements (Release 11)", 3GPP TS 36.214 V11.1.0, Dec. 2012, 1-14.

*Primary Examiner* — Thai Nguyen
(74) *Attorney, Agent, or Firm* — Murphy, Bilak & Homiller, PLLC

(57) ABSTRACT

The present disclosure relates to a method for managing inter-system interference performed by a network element (800; 900) in a victim cellular communication system (1) comprising a serving cell (3) serving a victim radio device (900A). The method comprises determining that the downlink (DL) reception quality of signals from the serving cell at the victim radio device is below a predetermined first threshold, implying poor DL radio signal quality. The method also comprises determining that the DL signal strength of signals from the serving cell at the victim radio device is above a predetermined second threshold, implying that the poor DL radio signal quality is due to either intra-system interference from DL signaling within said
(Continued)

victim system, or to inter-system interference from UL signaling in an aggressor system. If the victim cellular communication system comprises at least one neighboring cell (5), then the method also comprises determining that the DL signal strength of signals from said at least one neighboring cell is below a predetermined third threshold at the victim radio device. The method then comprises determining that the poor DL radio signal quality is due to radio interference from uplink (UL) signaling in an aggressor cell (4) comprised in an aggressor cellular communication system (2). The method also comprises applying interference resolution for mitigating the inter-system interference from the aggressor cell (4).

23 Claims, 8 Drawing Sheets

(51) Int. Cl.

| | | |
|---|---|---|
| *H04W 72/12* | (2009.01) | |
| *H04L 1/00* | (2006.01) | |
| *H04W 52/24* | (2009.01) | |
| *H04B 17/318* | (2015.01) | |
| *H04W 36/08* | (2009.01) | |
| *H04W 72/08* | (2009.01) | |
| *H04W 36/06* | (2009.01) | |
| *H04W 36/14* | (2009.01) | |

(52) U.S. Cl.
CPC ........... *H04W 16/14* (2013.01); *H04W 36/08* (2013.01); *H04W 52/244* (2013.01); *H04W 72/082* (2013.01); *H04W 72/1215* (2013.01); *H04W 36/06* (2013.01); *H04W 36/14* (2013.01)

(58) Field of Classification Search
CPC . H04W 72/1215; H04W 36/14; H04W 36/06; H04B 17/318; H04L 1/00
See application file for complete search history.

(56) References Cited

FOREIGN PATENT DOCUMENTS

| | | |
|---|---|---|
| WO | 2012095023 A1 | 7/2012 |
| WO | 2013045741 A1 | 4/2013 |
| WO | 2013102776 A1 | 7/2013 |

* cited by examiner

METHOD AND ARRANGEMENT IN A TELECOMMUNICATION SYSTEM

TECHNICAL FIELD

The present disclosure relates to method and device for managing inter-system interference between nearby user equipments.

BACKGROUND

Spectrum availability is limited and the usage of this resource is very high. Many different technologies co-exist in one region and in addition, different regions allocate the spectrum in a different manner.

Wireless communications is one of the technologies with high spectrum demand. New spectrum is constantly being allocated for this technology, either "free" or previously allocated for another use spectrum. The more bands are specified, the less frequency separation (guard bands) is possible to allocate between the systems (e.g. different cellular operator networks) in order to guarantee protection from interference between the systems. This small separation may lead into interference issues in case the uplink (UL) and downlink (DL) direction are not sufficiently far apart in frequency. There is a need to allow for deployment of UL and DL nearby in frequency while still keeping good performance from a system point of view.

Operating Bands

The standardization group of The Third Generation Partnership Project (3GPP) specifies requirements for 3GPP technologies. In particular, it standardizes the Universal Mobile Telecommunications System, UMTS, Terrestrial Radio Access (UTRA) and evolved UTRA (E-UTRA) technologies.

Technical Specifications (TS) are being developed by 3GPP, the radio requirements for both User Equipment (UE) and Base Station (BS) among them. In these specifications, the concept Operating Band is defined. An operating band is a set of contiguous frequencies allocated for radio device, e.g. UE, and/or base station transmission.

An operating band can be specified as a paired band or an unpaired band. A part of the Operating band is defined for UL (UE transmission/BS reception) and another part is designated for DL (UE reception/BS transmission) for paired or FDD (Frequency Division Duplex) bands. Both UL and DL function at the same time in case of FDD. On the other hand, both UL and DL share the same frequencies in case of unpaired or TDD (Time Division Duplex) bands. As an example Band 1 or Band I is an FDD band specified by 3GPP for both UTRA and E-UTRA technologies, UL E-UTRA Band 1 or UTRA FDD Band I is specified as 1920-1980 MHz and DL E-UTRA Band 1 or UTRA FDD Band I is defined as 2110-2170 MHz. An example of a TDD band is E-UTRA Band 38 or UTRA TDD Band d), which is defined as 2570-2620 MHz.

Unwanted Emissions

3GPP specifies requirements to ensure co-existence among different technologies. In particular, co-existence requirements to ensure deployment of E-UTRA and UTRA technologies in the same geographical area are included as part of the radio requirements. This is to ensure BS-BS, UE-UE UE-BS and BS-UE co-existence.

TS 25.101, 25.102 and 36.101 contain the Radio Core requirements for the UE. These specifications include, among others, UE emission requirements to ensure co-existence between devices implementing 3GPP technologies. 3GPP has specified a "standard UE spurious emissions for co-existence" equal to −50 dBm/MHz for E-UTRA co-existence, or corresponding −60 dBm/30.84 MHz for UTRA for DL protection. This corresponds to an UL requirement for the device to protect DL frequencies allocated for E-UTRA or UTRA and the level has been derived to ensure co-existence between radio devices in close proximity in terms of victim performance.

For an aggressor UE, it is feasible to fulfil −50 dBm/MHz of the standard UE spurious emissions for co-existence at a large frequency separation from its UL operating band. However, the closer this is required from the edge of the deployed carrier (i.e. the closer the frequency channels of the aggressor UE and a victim UE is), the more challenging it becomes to fulfil the −50 dBm/MHz requirement.

When there is a large frequency separation between the aggressor UL operating band and the victim DL operating band for which −50 dBm/MHz is required, the PA emissions can be further attenuated by the duplexer or RF filter. A-MPR (Additional Maximum Power Reduction) or power back-off may also be allowed for specific UL Operating Bands for which the filter attenuation is not enough to fulfil the co-existence requirements.

With the increase of spectrum being allocated to 3GPP technologies, there is a trend to allocate operating bands close to each other in frequency. As an example, E-UTRA Band 27 and E-UTRA Band 28 were introduced in the release 11 (Rel-11) of the 3GPP specifications. E-UTRA Band 27 UL/DL is defined as 807-824/852-869 MHz and E-UTRA Band 28 UL/DL is specified as 703-748/758-803 MHz. E-UTRA Band 27 UL is allocated at 4 MHz from E-UTRA Band 28 DL. In order to protect E-UTRA Band 28 DL, E-UTRA Band 27 devices are allowed to apply certain back-off. However, the back-off becomes quite large to fulfil the standard −50 dBm/MHz and the spurious emissions for E-UTRA Band 28 DL protection were relaxed up to −32 dBm/MHz for the closest frequencies to E-UTRA Band 27 UL. A problem is that with these relaxed out-of-band emissions (OOBE) levels in some bands, the co-existence of systems in nearby frequencies is not possible when UE-to-UE interference occurs. This means that the OOBE requirements should be made much more stringent to protect UEs from this type of interference or to devise new mechanisms to overcome the UE-to-UE type interference. Since toughening the OOBE requirements on UEs will incur high costs (putting more filters etc.), this is not a feasible solution.

UE Measurements

In order to assess the channel conditions of an active link, several measurements are done at both the UE and network level in order to maintain a radio connection of adequate quality. To inform the BS about the channel quality, all UEs periodically perform measurements on the Reference Signals (RS) transmitted by the BSs and send reports to the BS. Such measurements include: the Reference Signal Received Power (RSRP), Channel Quality indicator (CQI), Reference Signal Received Quality (RSRQ), and Received Interference Power. These measurement reports are then used by the BS to validate the channel conditions, measure interference levels and instigate resource optimization and handover procedures.

These measurements are described in 3GPP TS 36.214.

DEFINITIONS OF TERMS USED HEREIN

Serving Cell: The cell which the UE is connected to.
Neighboring cell: The cell which belongs to the same system as the serving cell and is a potential candidate for the UE to handover.

System: is a cellular communication network comprising of one or more cells. If there is only one cell in the system, then System=cell.

Victim System: The system which is experiencing interference. More specifically, the UEs belonging to this system are experiencing interference Aggressing/aggressor System: The system which is the cause of interference. More specifically, the UEs belonging to this system are the cause of interference.

Victim UE: the UE belonging to victim system which is experiencing interference

Aggressor UE: the UE belonging to the aggressing system, which is causing the interference Problems with Existing Solutions Filter or duplexer attenuation may help to further reduce the spurious emissions from a device and allow for enough protection to the victim system. However, this may not be possible if the victim system is very close in frequency to the aggressing system.

Other solutions to reduce emissions from the aggressor system are based on power back-off. This is associated with certain Network Signaling (NS). The NS value is band specific. The UE is allowed to apply a predefined maximum power back-off (if needed) when it receives the NS signal from the cell. New Network Signaling cannot be added to an already existing operating band.

For an already existing operating band, tougher filter attenuation near the band or addition of Network Signaling is not possible. In this scenario, UL resource block (RB) restrictions can be specified to reduce the emissions from a device. This is controlled by the BS scheduler. It has already been introduced, for example, for co-existence between E-UTRA Band 7 and E-UTRA Band 38. Another possibility is the reduction of the maximum output power (or P-max). P-max is configured by the cell and the limitation is carried by the UE. Restrictions on the UL allocations imply that not all the UL RB are utilized and therefore part of the bandwidth not in use. This affects the UL coverage. P-max implies a reduction of the UE maximum output power and therefore affects the UL coverage as well.

SUMMARY

It is an objective of the present disclosure to alleviate the problems with the prior art.

According to an aspect of the present disclosure, there is provided a method for managing inter-system interference performed by a network element in a victim cellular communication system comprising a serving cell serving a victim radio device. The method comprises determining that the downlink (DL) reception quality of signals from the serving cell at the victim radio device is below a predetermined first threshold, implying poor DL radio signal quality. The method also comprises determining that the DL signal strength of signals from the serving cell at the victim radio device is above a predetermined second threshold, implying that the poor DL radio signal quality is due to either intra-system interference from DL signaling (e.g. transmissions) within said victim system, or to inter-system interference from UL signaling (e.g. transmissions) in an aggressor system. If the victim cellular communication system comprises at least one neighboring cell, then the method also comprises determining that the DL signal strength of signals from said at least one neighboring cell is below a predetermined third threshold at the victim radio device. The method also comprises determining that the poor DL radio signal quality is due to radio interference from uplink (UL) signaling in an aggressor cell comprised in an aggressor cellular communication system. The method also comprises applying interference resolution for mitigating the inter-system interference from the aggressor cell.

According to another aspect of the present disclosure, there is provided a computer program product comprising computer-executable components for causing a network element to perform an embodiment of the method of the present disclosure when the computer-executable components are run on processor circuitry comprised in the network element.

According to another aspect of the present disclosure, there is provided a network element for a victim cellular communication system comprising a serving cell serving a victim radio device. The network element comprises processor circuitry, and a storage unit storing instructions executable by said processor circuitry whereby said network element is operative to determine that the DL reception quality of signals from the serving cell at the victim radio device is below a predetermined first threshold, implying poor DL radio signal quality. The network element is also operative to determine that the DL signal strength of signals from the serving cell at the victim radio device is above a predetermined second threshold, implying that the poor DL radio signal quality is due to either intra-system interference from DL signaling (e.g. transmissions) within said victim system, or to inter-system interference from UL signaling (e.g. transmissions) in an aggressor system. If the victim cellular communication system comprises at least one neighboring cell, then the network element is also operative to determine that the DL signal strength of signals from said at least one neighboring cell is below a predetermined third threshold at the victim radio device. The network element is also operative to determine that the poor DL radio signal quality is due to radio interference from UL signaling in an aggressor cell comprised in an aggressor cellular communication system. The network element is also operative to apply interference resolution for mitigating the inter-system interference from the aggressor cell.

According to another aspect of the present disclosure, there is provided a radio device comprising (e.g. being) an embodiment of the network element of the present disclosure.

According to another aspect of the present disclosure, there is provided a base station comprising (e.g. being) an embodiment of the network element of the present disclosure.

According to another aspect of the present disclosure, there is provided a computer program for a network element in a victim cellular communication system comprising a serving cell serving a victim radio device. The computer program comprises computer program code which is able to, when run on processor circuitry of the network element, cause the network element to determine that the DL reception quality of signals from the serving cell at the victim radio device is below a predetermined first threshold, implying poor DL radio signal quality. The code is also able to cause the network element to determine that the DL signal strength of signals from the serving cell at the victim radio device is above a predetermined second threshold, implying that the poor DL radio signal quality is due to either intra-system interference from DL signaling (e.g. transmissions) within said victim system, or to inter-system interference from UL signaling (e.g. transmissions) in an aggressor system. If the victim cellular communication system comprises at least one neighboring cell, the code is also able to cause the network element to determine that the DL signal strength of signals from said at least one neighboring cell is below a predetermined third threshold at the victim radio device. The code is also able to cause the network element to determine that the poor DL radio signal quality is due to radio interference from UL signaling in an aggressor cell comprised in an aggressor cellular communication system. The code is also able to cause the network element to apply interference resolution for mitigating the inter-system interference from the aggressor cell. The claimed network element is configured to work according to the claimed method.

According to another aspect of the present disclosure, there is provided a computer program product comprising an embodiment of the computer program of the present disclosure and a computer readable means on which the computer program is stored.

It is an advantage of embodiments of the present disclosure that the reason for bad DL reception quality of a radio device can be determined in a systematic way, allowing appropriate measures to alleviate the poor quality to be taken.

Embodiments of the present disclosure propose mechanisms for UE interference mitigation. Each such mechanism may be used independently of each other, while according to a specific embodiment, an iterative interference mitigation technique comprising one or more separate mechanisms is used in order to protect the UEs suffering from high interference from nearby UE(s). The interference mitigation may conveniently be applied after having determined that poor DL radio signal quality at a victim radio device is due to radio interference from UL signaling in an aggressor system, in accordance with the present disclosure. Alternatively, embodiments of the interference mitigation of the present disclosure may be applied independently of said determining that poor DL radio signal quality at a victim radio device is due to radio interference from UL signaling in an aggressor system. The proposed mechanisms enable to reduce the interference level received by a victim UE in highly sensitive intra-band or inter-band interference scenarios. This will lead to improvements in UE performance (SINR or throughput). Some embodiments of the invention comprise an iterative process to combat interference such that the BS first detects a particular (inter-system) interference situation and then tries to mitigate the interference problem.

The victim system detects an interference event where it is determined if the victim UE is experiencing high interference from another UE transmitting in an adjacent or nearby channel. Once this is established, the BS or radio device (herein also interchangeably called a UE) may employ one or more of the following mechanisms to overcome the interference situation. According to specific embodiments, the mechanisms below may be employed in a sequential order according to the following:

I. Re-scheduling of the UE on non-overlapping Resource Blocks (RBs)-where the UE is allocated in a different set of resource blocks than the ones currently used to move it further away (in frequency) from the interferer. Furthermore, information about the positioning of the UE may be used to avoid frequency resource scheduling conflicts within a certain radius of the interferer(s).

II. Provision of service to the victim UE from a different cell or BS operating in the same frequency channel but on non-overlapping RBs—where it is determined if there is another BS in the vicinity that can potentially service the victim UE and in RBs different to the one(s) currently allocated to that UE and the UE is redirected to connect to that BS instead.

III. Provision of service to the victim UE from a BS operating in a different operating channel in the same or different band—where the UE is instructed to connect to the BS that is operating on a different operating channel.

IV. Enabling inter-system coordination—The interfering system is requested to move the interfering UE to a different frequency channel to increase frequency separation between victim and aggressor UEs.

Some advantages of embodiments of the present disclosure may include:
  Reduction of inter-system interference in both intra-band and inter-band deployment scenarios
  Improvement of UE performance (SINR & throughput)
  Improved co-existence of systems when the victim receives high OOBE levels Other objects, advantages and novel features of the present disclosure will become apparent from the following detailed description when considered in conjunction with the accompanying drawings and claims.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

BRIEF DESCRIPTION OF THE DRAWINGS

Embodiments will be described, by way of example, with reference to the accompanying drawings, in which.

DETAILED DESCRIPTION

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art. Like numbers refer to like elements throughout the description.

In the following description, for purposes of explanation and not limitation, specific details are set forth such as particular architectures, interfaces, techniques, etc. in order to provide a thorough understanding of the invention. However, it will be apparent to those skilled in the art that the invention may be practiced in other embodiments that depart from these specific details. In other instances, detailed descriptions of well-known devices, circuits, and methods are omitted so as not to obscure the description of the invention with unnecessary details.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification are not necessarily all referring to the same embodiment. Further, the particular features, structures or characteristics may be combined in any suitable manner in one or more embodiments.

Embodiments of the present disclosure may be exemplified in the following non-limiting description.

A communication "system" is herein a radio communication network with one or a plurality of cells with a common control, e.g. an operator network. If the system comprises a plurality of cells, they are synced with each other with regard to UL and DL direction of transmission for FDD. The victim system is the system comprising the serving cell serving a victim radio device. The victim system may also comprise one or more neighboring cells which have a control function in common with the serving cell and is synced with the serving cell, and which may operate in the same frequency channel as the serving cell or in a different frequency channel (possibly even in a different frequency band) than the serving cell. Similarly, the aggressor system comprises one or more aggressor cell(s) which are not controlled by the same control function as the victim system and which operates in a different frequency channel as that of the victim system. In case of FDD, the aggressor system may operate in UL while the victim system operates in DL. In case of TDD, the aggressor system may operate on an UL/DL configuration that is different than that of the victim system.

Figure 1:
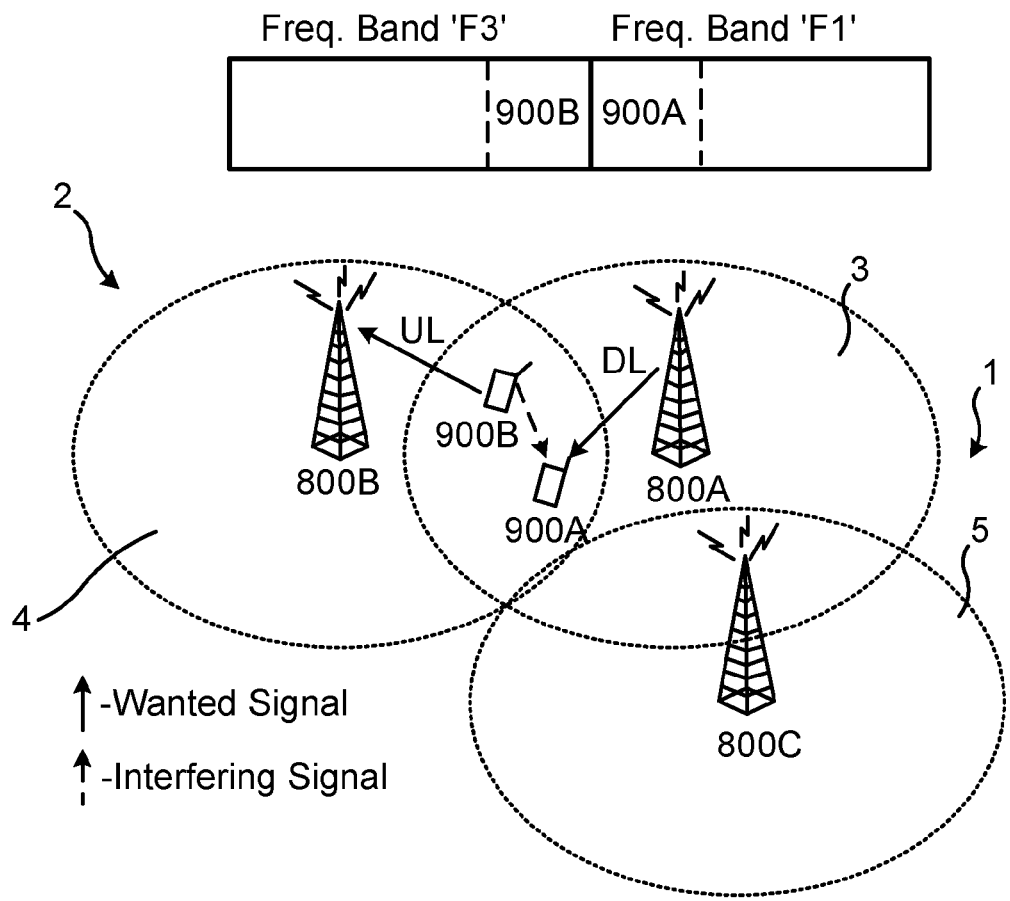
FIG. 1: Interference scenario illustration
Figure 2:
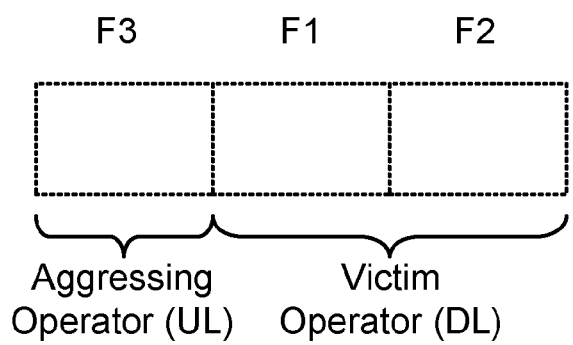
FIG. 2: Example frequency allocation scenario

Victim System Characteristics/Assumptions:
We assume the presence of a serving cell in this system
We may assume the presence of neighboring cells in the victim system, but the idea is still applicable in the absence of the neighboring cells.
We may assume that the victim UE can operate on two operating bands, F1 and F2, as shown in FIGS. 1 and 2.
The victim system may have an allocation of certain frequency channels within the two bands F1 and F2.

Aggressing System Characteristics/Assumptions:
We assume the presence of an aggressor cell in this system, serving an aggressor radio device.
We assume the presence of an aggressing radio device operating in the aggressor cell of the aggressing system. The aggressing radio device is typically located close to the victim radio device which is connected to the serving cell of the victim system.
We may assume that the aggressor system operates in one frequency band F3. The aggressor UE may support more than one frequency bands, but this is not relevant to the present disclosure.
The aggressing system may have an allocation of a certain frequency channel within the band F3.
The aggressing system operates, at least part of the time, in UL, in a different frequency channel than the victim.

It is, however, noted that the aggressor system may operate on a channel in the same band as a channel used by the victim system.

Embodiments of the present disclosure may be used to manage any interference between radio devices (UE-UE interference) of different systems, e.g. in the following cases:

1. When two unsynchronized and/or uncoordinated TDD systems are operating within the same or adjacent bands.
2. When an FDD (UL) system is operating in a band adjacent to another band with FDD (DL).
3. When an unsynchronized and/or uncoordinated TDD system is operating in adjacent band to an FDD system.
4. Other cases where systems are not in adjacent bands but the spurious emission levels do not guarantee UE-UE interference protection.

In general, the UE-UE interference happens when one system is operating in UL and another system is operating in DL.

In the following, a description of the proposed interference mitigation schemes briefly described in the summary section will be provided. The embodiments for the interference resolution mechanisms are discussed in the form of flow charts and event diagrams and additional messages are proposed to enable the coordination between the BSs wherever necessary.

In general, the overall idea of embodiments of this disclosure is applicable under the circumstances where two systems (e.g. two different cellular operator radio networks) are being operated, e.g. in frequency channels adjacent or nearby, with dissimilar direction of transmission, i.e. one system operating in UL and the other system operating in DL, within the same geographical region, where two or more UEs belonging to different systems are in close proximity of one another, see FIG. 1. Such a situation may lead to UE-to-UE interference, which can result in significant degradation of the victim UE performance.

Some embodiments of this disclosure propose an iterative interference mitigation technique aimed to protect such UEs suffering from UE interference from nearby UE(s). In general, embodiments of this disclosure can be segregated in two blocks, presented below, based on the procedures to be carried out. The first part governs the detection of inter-system interference where the victim system identifies that the UEs connected to it are experiencing UE-to-UE interference. Once this is established, the victim system may trigger an interference resolution procedure where one or more interference mitigation techniques may be applied in order to reduce the interference. The base station may step through sequential interference mitigation techniques in attempt to reduce the interference levels.

In this description, the term "serving cell" refers to the cell to which the UE is currently connected and experiencing interference (i.e. victim UE) is connected.

The term "neighboring cells" in this description indicate the candidate cells in the victim system to which the UE may be handed over. These cells may operate in the same or different frequency channel (or even frequency band) as the serving cell.

Referring to FIG. 1: The embodiments disclosed herein may be performed by a network element such as a base station 800, in LTE terminology referred to as an eNodeB, or by a radio device/UE 900. With reference to FIG. 1, aggressor BS 800B, serving the aggressor cell 4 of the aggressor system 2, is in communication with aggressor radio device/UE 900B and possibly other aggressor UE(s) 900 (not shown), while victim BS 800A serving the victim cell 3 (herein also called the serving BS 800A of the serving cell 3) of the victim system 1 is in communication with the victim UE 900A and possibly other victim UE(s) 900 (not shown). In FIG. 1, UE 900A is the victim UE receiving in the downlink that is exposed to interference from the aggressor UE 900B that transmits in the uplink. The victim system 1 may (or may not) also comprise further cells, herein called neighboring cell(s) 5 served by a neighboring BS 800C (only one neighboring cell 5 shown in the figure). Similarly, the aggressor system 2 may comprise further cells (not shown).

1. Inter-System Interference Event Detection:

The first part, or block, of this disclosure governs the detection of inter-system UE-to-UE interference condition. In this block, the victim system makes sure that the interference experienced by the victim UE is due to another (aggressing) UE that is transmitting in the UL, hence resulting in UE-to-UE interference. This condition is detected by a 'process of elimination', where the victim system determines the interference levels from all the neighboring cells to ensure that the interference is coming from a UE connected to a cell operating in a frequency channel different to the victim system (i.e. ensuring that this is an inter-system interference scenario).

Figure 4:
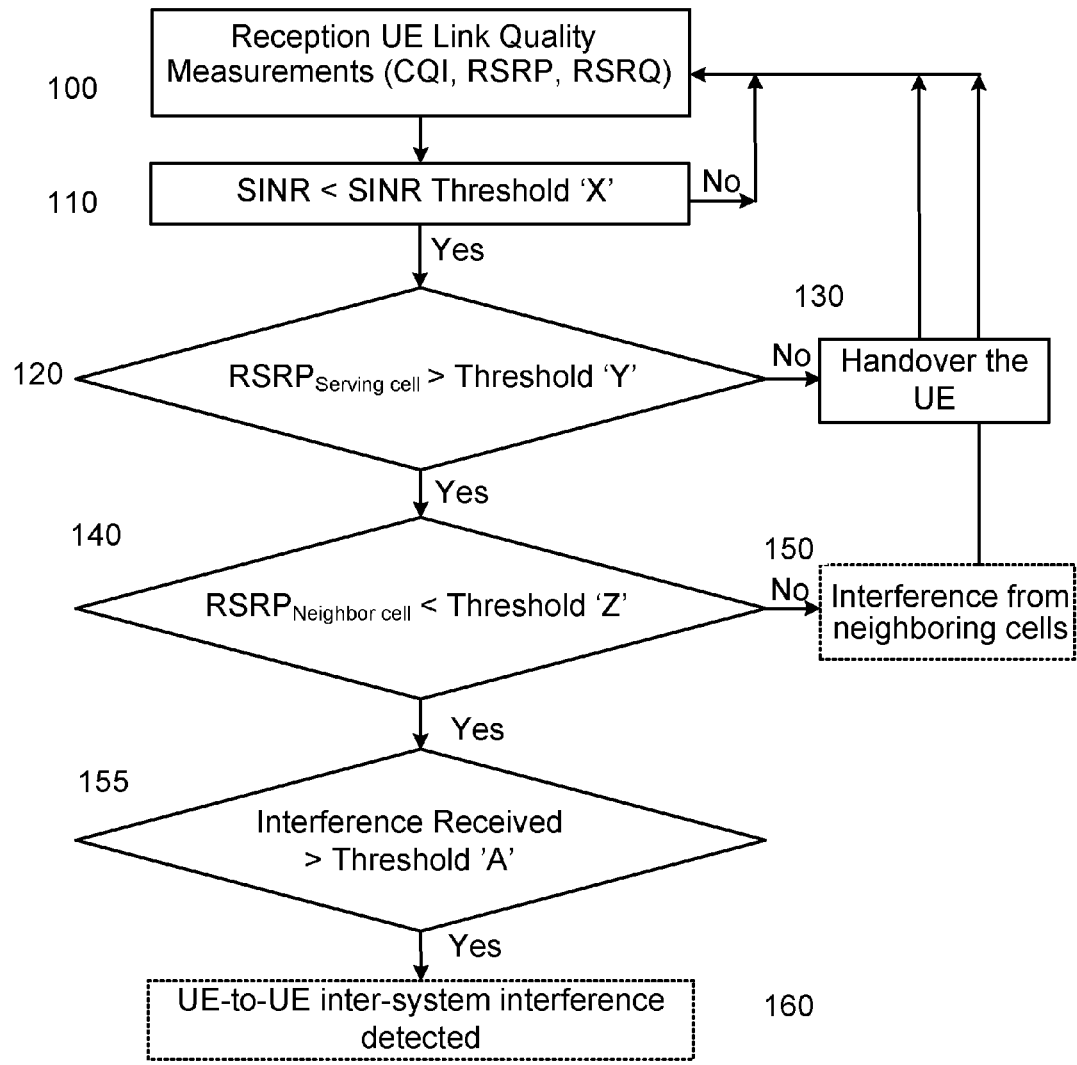
FIG. 4: Flow chart for interference event detection

This mechanism is illustrated in terms of a flow chart in FIG. 4. Step 100 denotes the condition where the BS receives the periodic measurement reports from the UEs to assess the channel conditions. Based on these measurement reports from the UE, the link quality of the UEs in the cell can be estimated at the base station.

At step 110 it is checked whether the quality of the link is below a given SINR threshold, SINR_Threshold:

$$\text{SINR} < \text{SINR\_Threshold} \tag{1}$$

i.e., it is checked whether the link quality (i.e. the downlink, DL, reception quality of signals from the serving cell at the victim radio device) is below an acceptable level (herein also called threshold X). A low SINR level can be a result of either:

i) Poor signal strength from the serving BS, or ii) High neighboring cell interference resulting from UE transmissions in the neighboring cells of the victim system, operating in the same frequency channel as the victim UE, or iii) High interference originated from another UE(s) in close proximity of the victim UE belonging to another system (aggressor system) that is operated in a frequency channel other than the victim UE.

To determine whether the low signal quality (SINR) is due to the presence of a UE belonging to another system that is being operated in a different frequency channel to the victim UE, RSRP levels from the serving BS are checked 120 (see FIG. 4).

If the RSRP levels at step 120 are less than a certain threshold 'Y', this means that the low SINR is observed due to condition (i) and the UE shall be instructed to perform the normal handover procedures 130. However, if the signal strength of the serving BS is greater than threshold 'Y', then at step 140, it is verified if the cause of low SINR is the system internal (ii) or external interference (iii). If the RSRP of the neighboring cells in the victim system is greater than a certain threshold 'Z', this indicates that the low SINR is a result of condition (ii) 150. However, if the threshold is less than 'Z', this indicates that the low SINR is due to condition (iii). To further ensure this, the BS may optionally verify 155 the interference levels received at the victim UE and if the interference is greater than a certain threshold 'A', this shall establish the occurrence of UE-to-UE inter-system interference event.

The interference resolution explained below may be applied when a low SINR is due to condition (iii) explained above.

In FIG. 4, analysis of the received information in step 100 is performed by a network node such as a base station. In an alternative embodiment, however, the steps no through 140, such as SINR, RSRP thresholds comparison, could be performed by a radio device/user equipment that then informs the network node about the interferer.

2. Interference Resolution

The interference resolution may be applied regardless of whether inter-system interference event detection has been performed. However, as an example, it is often herein assumed that an embodiment of the inter-system interference event detection of the present disclosure has been performed prior to applying an embodiment of the interference resolution of the present disclosure. Once it has been established that the interference experienced by the victim UE is due to the presence of another UE in close proximity that belongs to a system operating on a frequency channel different to the victim UE, the BS may trigger a series of interference resolution mechanisms in an effort to mitigate the interference and improve the SINR of the victim link. It should be noted that each of these interference resolution mechanisms may alternatively be used separately.

According to specific embodiments, the BS traverses through various interference resolution mechanisms in a sequential manner in an effort to combat interference. Mechanism I below may be applied as the first attempt to resolve the interference problem. If this does not solve the problem, Mechanisms II/III may be attempted. Similarly, mechanism IV is attempted if also mechanism II/III is unsuccessful in resolving the interference issue.

I. Interference Resolution Mechanism I

Figure 5:
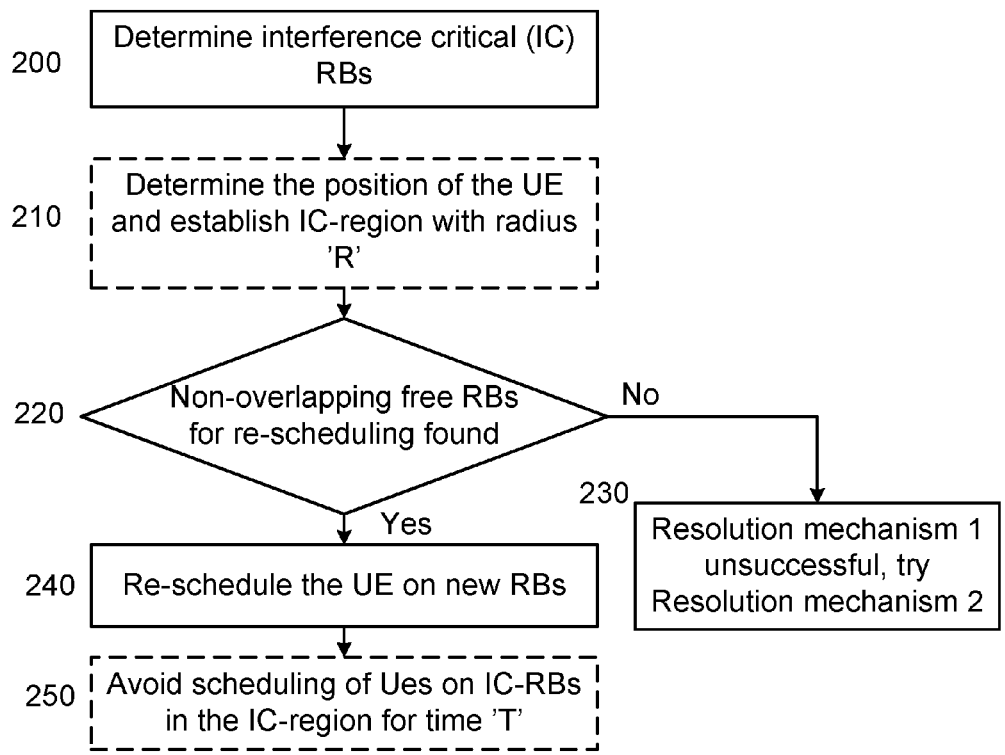
FIG. 5: Flow chart for Interference Resolution Mechanism I (Re-scheduling)

Reference is made to FIG. 5. At Step 200, the BS determines the Interference Critical (IC) resource blocks (RB) to avoid resource collision. Interference Critical (IC) RBs are the ones on which the UE is currently scheduled and experiencing high interference. Once the IC-RBs are determined, the BS may further establish an IC-Region around the victim UE at step 210. This region is defined as the area around the victim UE on which the BS avoids the scheduling of UEs on the IC-RBs. This is temporary. i.e. the scheduling of the UEs on IC-RBs in the IC-region is avoided temporarily for a period 'T'. The "IC-region" is decided by the information about the position of the UE (position may e.g. be determined based on the path-loss, received signal strength and angle of arrival and is applicable during a period "T". Other position determination mechanisms include the triangulation method). Information about the IC-Region may be used to avoid the scheduling of UEs in this region on the overlapping IC RBs during a period "T".

The BS then (at step 220) checks if there are resources available in the serving cell to re-schedule the UE. This means that the BS tries to identify RBs that do not overlap with the previously determined IC-RBs. If this condition is fulfilled, the BS re-schedules the UE on these new RBs at step 240. The BS may further avoid scheduling any UE on IC-RBs in the IC-region for a certain period of time T. The time period 'T' may depend on the traffic load in the system. However, in case the BS cannot find any non-overlapping interference-free RBs, it will try the interference resolution mechanism II.

II & III. Interference Resolution Mechanisms II and III

For the case when the BS cannot find any non-interfered available resources to re-schedule the victim UE, interference resolution mechanism I is unsuccessful. In this case, the BS shall try to find other neighboring cells operating in the same or a different frequency channel than the serving cell that can provide service to the victim UE. The FIG. 2 illustrates an example scenario to support the discussion.

Figure 6:
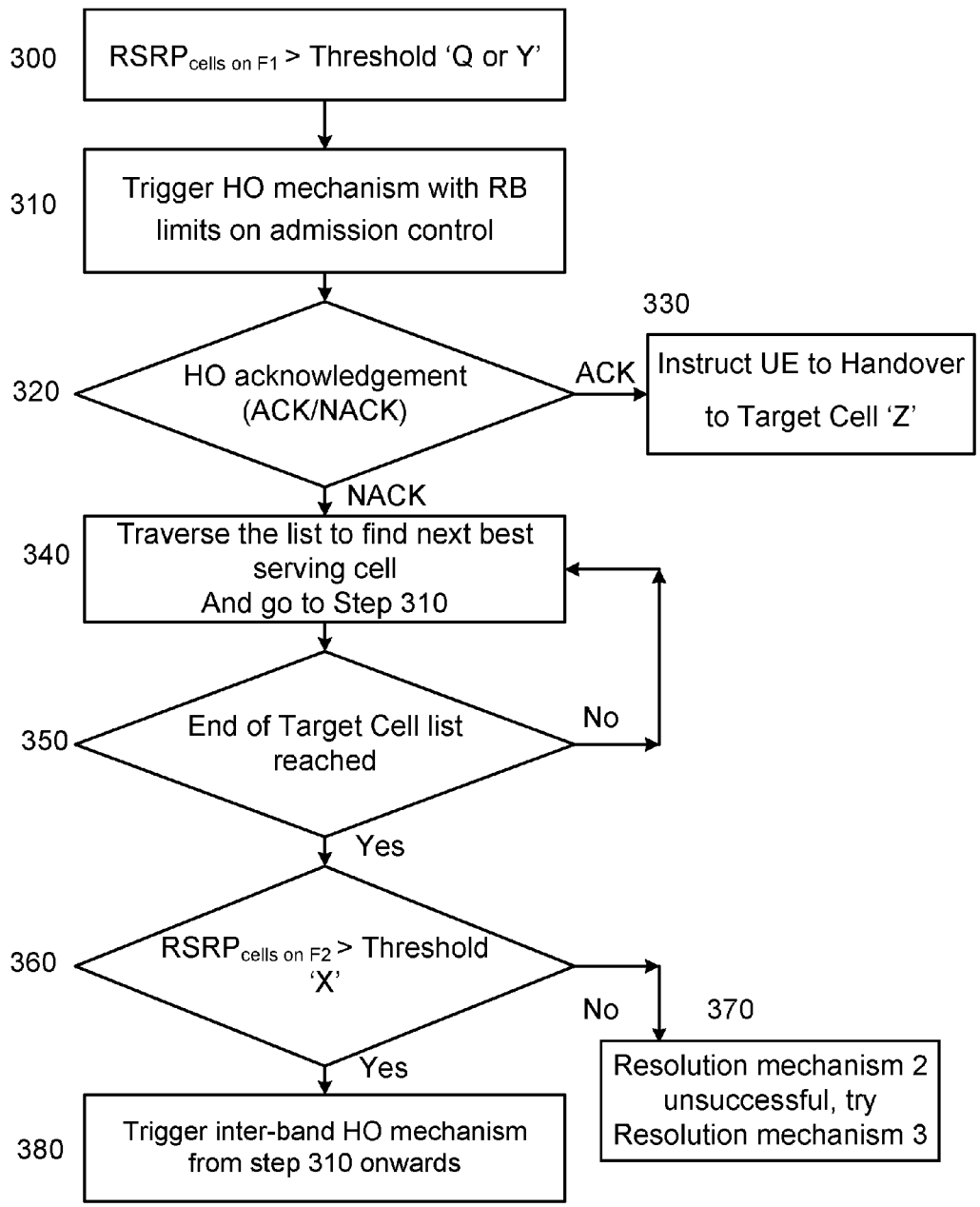
FIG. 6: Flow chart for Interference Resolution Mechanisms II & III (Intra-band and inter-band Handover)

It is observed that the aggressing UE 900B is transmitting in frequency band F3, whereas the victim UE 900A is currently receiving in operating band F1. The victim UE also supports reception in operating band F2. The embodiment for the interference resolution mechanisms II and III are illustrated in FIG. 6, where at step 300, the victim system 1 tries to identify the second best serving cell based on the RSRP reports from the victim UE. Reports on frequency band F1 refer to intra-band scenario. If the RSRP of a neighboring cell 5 (see FIG. 1) operating in frequency F1 is greater than threshold 'Q', this means that this neighboring cell can provide service to the victim UE. However, to mitigate the interference, the service needs to be provided on RBs that do not collide with the IC-RBs (identified in resolution mechanism I).

At this point (step 310), the serving BS 800A of the victim UE 900A sends a coordination request to the candidate neighboring cell 5 to verify if the neighboring cell can provide service to the victim UE on non-IC RBs. The handover is made if an ACK is received from the neighboring cell. There can be two possible ways to perform this inter-cell co-ordination:

1. Modify the Handover (HO) message to contain an optional element indicating the need for handover due to inter-system interference. The HO message will then contain the IC-RBs. The neighboring cell will then evaluate if it can provide service to the UE on non-IC RBs and reply with an ACK/NACK.

2. Define a new (handover like) co-ordination message where the serving BS performs a handshake with the selected candidate neighboring cell to identify if the neighboring cell have RBs that do not collide with the IC-RBs. This can further be done in two ways:

a. The serving BS of the victim UE asks the candidate neighbor cell to provide information about the available resources (RBs) and then itself determines if a handover can be made on RBs different than the IC RBs, or b. The serving BS asks the candidate neighbor if there are resources that do not overlap with IC-RBs. Then the BS of the candidate neighbor cell performs this check and returns an ACK/NACK (Acknowledgement/Non-Acknowledgement), which is used as a trigger to the normal HO mechanism.

If we assume that method 1 (modifying the HO message) described above and at step 320 is used, the serving BS of the victim UE receives an ACK/NACK for the handover request sent at step 310. In case an ACK is received, this means that the neighboring cell can provide service to the UE. However, in case a NACK is received, the victim BS traverses through the list of candidate neighbor cells to find the next best neighbor cell operating in the same frequency channel of the operating band F1 by performing the test (at step 300).

In case the serving BS cannot find any neighboring cell operating in the same frequency channel for the handover of UE (mechanism II), then an attempt is made for inter-band HO (mechanism III) and the same procedure as explained above is repeated for all the neighboring cells operating on other operating bands, for example band F-2 in FIG. 2. In the worst case, the victim BS might not find any candidate neighboring cell that can provide interference-free service to the victim UE. In this case, the BS may attempt to mitigate interference with interference resolution mechanism IV.

IV. Interference Resolution Mechanism IV

Figure 3:
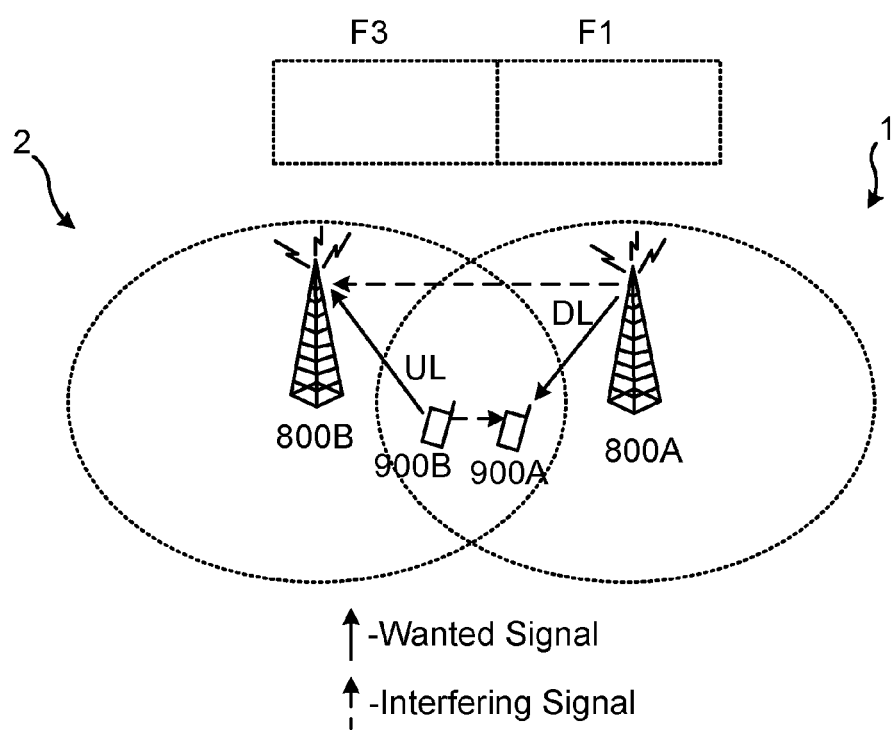
FIG. 3: Scenario for inter-operator coordination

Interference resolution mechanism IV may be applied if the two systems (e.g. two systems having different operators) perform interference coordination to avoid causing interference to each other for mutual benefits. For spectrum allocations in close proximity (in frequency) where one operator is operating in UL and another operator is operating in DL, at least partially, such (interference coordination) arrangements may be likely. Consider the scenario in FIG. 3.

It can be observed that the system 1 operating in DL causes BS-to-BS interference for the system 2 operating in UL and similarly, the system 2 operating in UL causes UE-to-UE interference for the system 1 operating in DL. Thus, there is incentive for both the systems to cooperate and avoid interference to each other wherever necessary.

Figure 7:
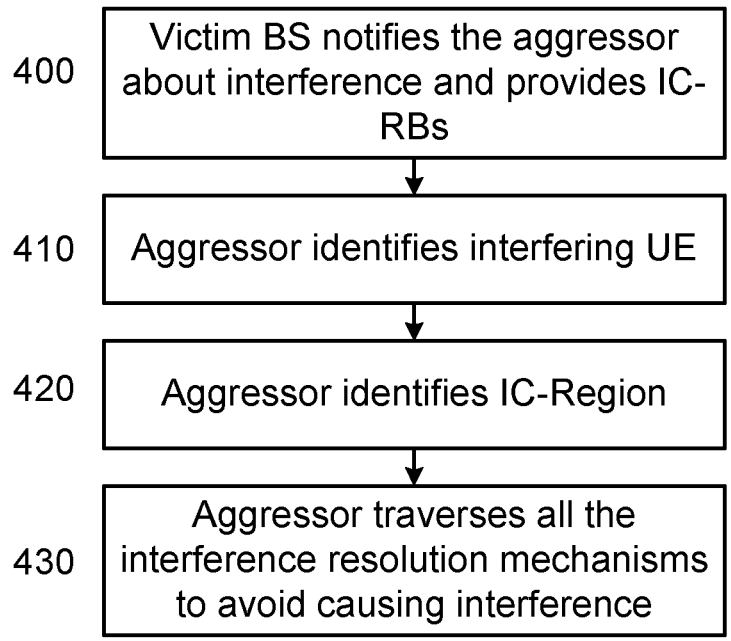
FIG. 7: Flow chart for Interference Resolution Mechanism IV

Under this scenario, if the resolution mechanisms II and III are unsuccessful, the serving BS 800A shall notify the aggressing system 2 about the interference caused by it and provide the interference critical (IC) RB information (at step 400, FIG. 7). This information may further be complemented by additional information about the position of the victim UE 900A which shall assist the aggressing system 2 to identify the interfering UE 900B.

When the aggressing system 2 receives this information, it may try to identify the interfering UE which is the cause of this interference and mark its own IC RBs at step 410. Once these RBs are identified, the aggressing system may also determine an IC-Region to avoid causing more interference in that particular region. This may be applicable for a period "T1". Having performed these steps, the interference resolution mechanisms I and II/III are employed by the aggressing system 2 to avoid interference towards the victim UE 900A, as explained herein.

Figure 8:
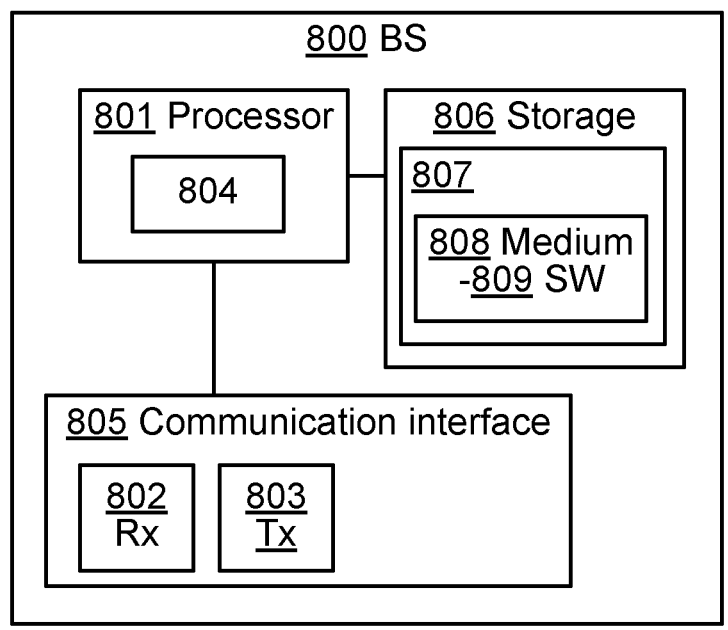
FIG. 8: Schematic illustration of a base station

FIG. 8 schematically illustrates an example embodiment of a network node/BS Boo configured to perform the exemplary methods described herein, e.g. in relation to FIG. 4-7. The network node is adapted to be comprised in a network, e.g. the victim system 1. The network node Boo comprises a communication interface 805 comprising a receiver 802 and a transmitter 803 for communicating with a user equipment 900. The network node Boo furthermore comprises a processor 801 comprising processing circuitry 804 configured to carry out method steps according to the exemplary embodiments described herein.

The method actions performed by the network node are performed by functional elements of the processing circuitry 804. In some embodiments these functions are carried out by appropriately programmed microprocessors or microcontrollers, alone or in conjunction with other digital hardware, which may include digital signal processors (DSPs), special-purpose digital logic, and the like. Either or both of the microprocessors and digital hardware may be configured to execute program code or software (SW) 809 stored in a memory or storage unit 806 on a medium 808 of a computer program product 807. Again, because the various details and engineering tradeoffs associated with the design of baseband processing circuitry for mobile devices 900 and wireless base stations Boo are well known and are unnecessary to a full understanding of embodiments herein, additional details are not shown here. Program code 809 is stored in a memory 806 that may comprise one or several types of memory such as read-only memory (ROM), random-access memory, cache memory, flash memory devices, optical storage devices, etc., and includes program instructions for executing one or more telecommunications and/or data communications protocols, as well as instructions for carrying out one or more of the techniques described herein, in several embodiments. Of course, it will be appreciated that not all of the steps of these techniques are necessarily performed in a single microprocessor or even in a single module.

Figure 9:
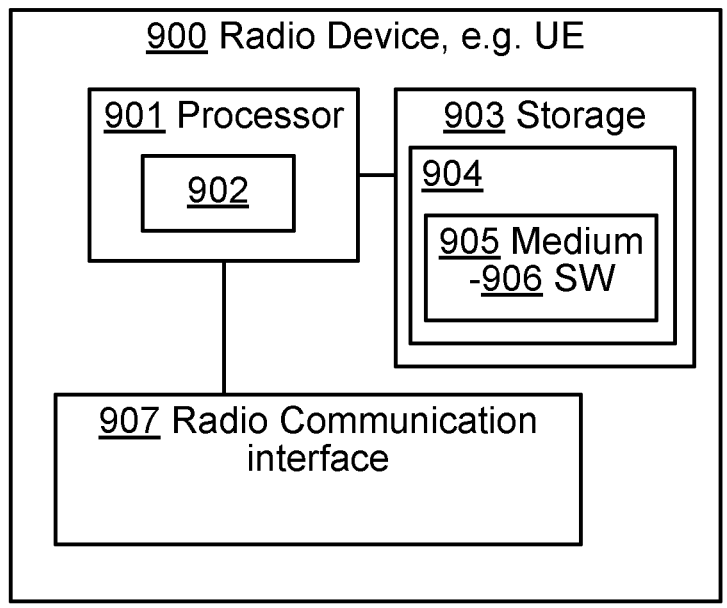
FIG. 9: Schematic illustration of a radio device

FIG. 9 schematically shows an embodiment of a radio device 900 of the present disclosure configured to perform the exemplary methods described herein, e.g. in relation to FIGS. 4-7. The radio device is adapted to be comprised in a network, e.g. the victim system 1. The radio device 900 comprises a radio communication interface 907 comprising a receiver and a transmitter for communicating with a base station 800. The radio device 900 furthermore comprises a processor 901 comprising processing circuitry 902 configured to carry out method steps according to the exemplary embodiments described herein.

The method actions performed by the radio device 900 are performed by functional elements of the processing circuitry 902. In some embodiments these functions are carried out by appropriately programmed microprocessors or microcontrollers, alone or in conjunction with other digital hardware, which may include digital signal processors (DSPs), special-purpose digital logic, and the like. Either or both of the microprocessors and digital hardware may be configured to execute program code or software (SW) 906 stored in a memory or storage unit 903 on a medium 905 of a computer program product 904. Again, because the various details and engineering tradeoffs associated with the design of baseband processing circuitry for mobile devices 900 and wireless base stations Boo are well known and are unnecessary to a full understanding of embodiments herein, additional details are not shown here. Program code 906 is stored in a memory 903 that may comprise one or several types of memory such as read-only memory (ROM), random-access memory, cache memory, flash memory devices, optical storage devices, etc., and includes program instructions for executing one or more telecommunications and/or data communications protocols, as well as instructions for carrying out one or more of the techniques described herein, in several embodiments. Of course, it will be appreciated that not all of the steps of these techniques are necessarily performed in a single microprocessor or even in a single module.

The radio device/user equipment 900 also comprises a radio communication interface 907, comprising a transmitter and a receiver, for communicating with the radio network node 800. The network node 800, e.g. the eNodeB, comprises corresponding communication interface comprising a transmitter and a receiver, for communicating with the user equipment 900.

The network element of the present disclosure may e.g. be or be comprised in a BS 800 as discussed herein e.g. in relation to FIG. 8 or a be or be comprised in a radio device 900 as discussed herein e.g. in relation to FIG. 9.

Figure 10:
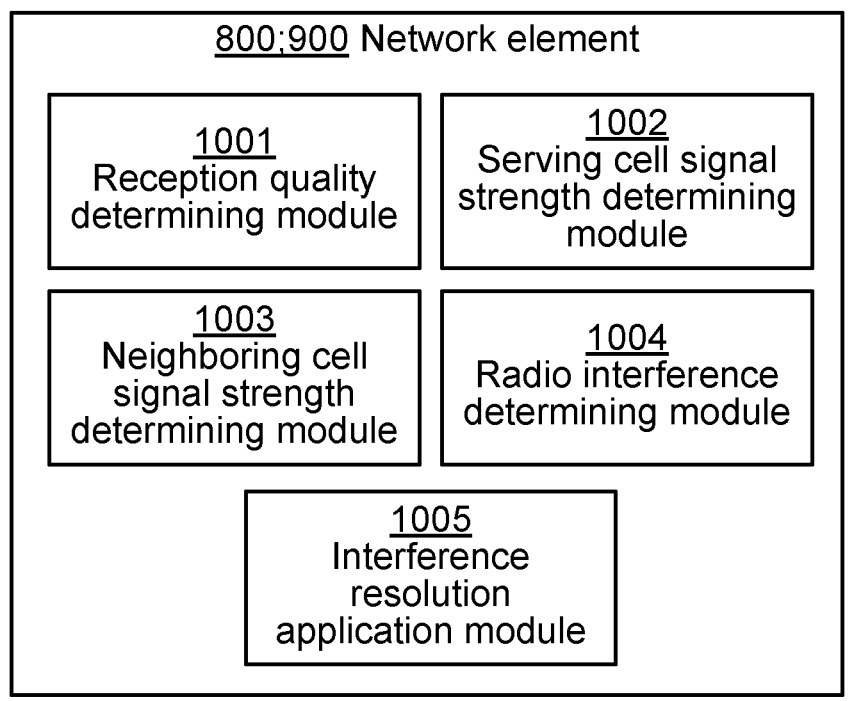
FIG. 10 is a schematic block diagram of functional modules in a network element in accordance with the present disclosure.

FIG. 10 is a schematic block diagram illustrating an embodiment of the network element 800 or 900. As previously mentioned, the processor circuitry 804/902 may run software 809/906 for enabling the BS or radio device, and thus the network element, to perform an embodiment of the method of the present disclosure, whereby functional modules may be formed in network element, e.g. in the processor circuitry 804/902 for performing the different steps of the method. These modules are schematically illustrated as blocks within the network element 800/900 in FIG. 10. Thus, the network element comprises a reception quality determining module 1001 for determining that the DL reception quality of signals from the serving cell 3 at the victim radio device 900A is below a predetermined first threshold X. The network element also comprises a serving cell signal strength determining module 1002 for determining that the DL signal strength of signals from the serving cell 3 at the victim radio device 900A is above a predetermined second threshold Y. The network element optionally also comprises a neighboring cell signal strength determining module 1003 for determining that the DL signal strength of signals from at least one neighboring cell 5 is below a predetermined third threshold Z at the victim radio device 900A. The network element also comprises a radio interference determining module 1004 for determining that the poor DL radio signal quality is due to radio interference from UL transmissions in an aggressor cell 4. The network element also comprises an interference resolution application module 1005 for applying interference resolution for mitigating the inter-system interference from the aggressor cell 4.

Figure 11A:
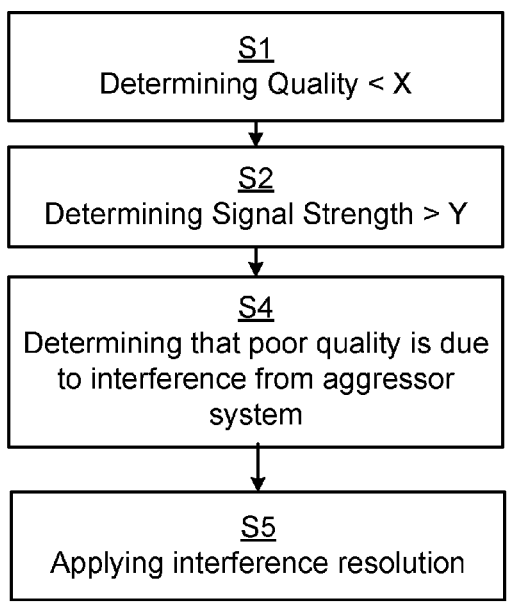
FIG. 11a is a schematic flow chart of an embodiment of a method of the present disclosure.

FIG. 11a is a schematic flow chart of an embodiment of a method of the present disclosure. The method is performed by a network element, e.g. a radio device/UE 900 or a BS or other network node Boo, in a victim cellular communication system 1. The victim system 1 comprises a serving cell 3 which is serving a victim radio device 900A. It is in this example embodiment assumed that the serving cell 3 is the only cell in the victim system, or at least the only cell of the victim system 1 which is relevant to the victim radio device. The network element 800/900 determines S1 that the DL reception quality of signals from the serving cell 3 at the victim radio device 900A is below a predetermined first threshold X, implying poor DL radio signal quality. It has thus been determined S1 that the DL radio signal quality is inferior but the reason for the inferior quality is not known from this step. Thus, the network element also determines S2 that the DL signal strength of signals from the serving cell 2 at the victim radio device 900A is above a predetermined second threshold Y, implying that the poor DL radio signal quality is due to radio interference. Y is set such that, a signal strength of the serving cell above Y implies that the poor DL radio signal quality is not due to too low signal strength from the serving cell (e.g. due to the radio device being too far from the BS) in which case the radio device should instead be handed over to e.g. a neighboring cell 5 of the victim system with a higher signal strength at the victim radio device. Since the poor quality is not due to low signal strength, it is due to radio interference and it may be assumed that this radio interference is due to radio interference from UL signaling in an aggressor cell 4, especially since the victim system does not include any neighboring cells 5 which may cause intra-system interference to the victim radio device. Thus, the network element then determines S4 that the poor DL quality is due to radio interference from UL transmissions in an aggressor cell 4 comprised in an aggressor cellular communication system 2. The DL reception quality of signals from the serving cell as well as the DL signal strength may be obtained by or from the victim radio device which may regularly perform such standard measurements. The network element then typically applies S5 interference resolution for mitigating the radio interference from the aggressor cell 4, as also mentioned in relation to FIG. 11b.

Figure 11B:
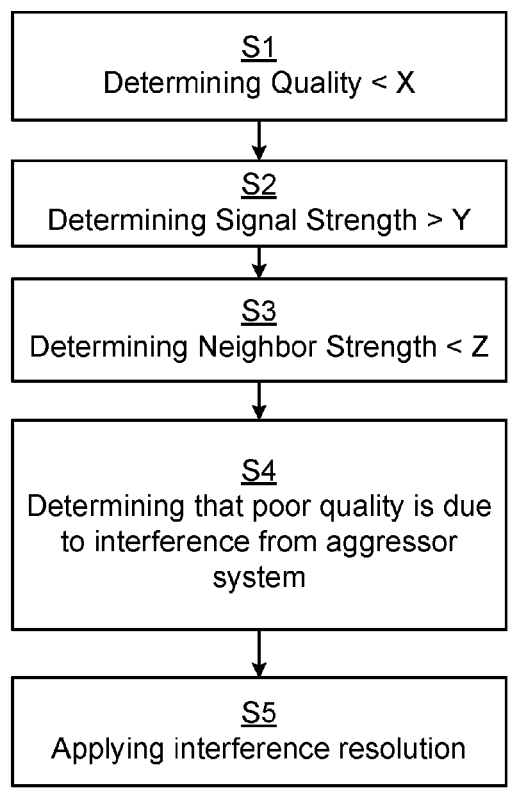
FIG. 11b is a schematic flow chart of another embodiment of a method of the present disclosure.

FIG. 11b is a schematic flow chart of another embodiment of a method of the present disclosure. The steps of determining S1 that the DL reception quality of signals from the serving cell 3 at the victim radio device 900A is below a predetermined first threshold X, determining S2 that the DL signal strength of signals from the serving cell 2 at the victim radio device 900A is above a predetermined second threshold Y, and determining S4 that the poor DL radio signal quality is due to radio interference from UL signaling in an aggressor cell 4 are as discussed in relation to FIG. 11a. Before determining S4 that the poor DL radio signal quality is due to radio interference from UL signaling in an aggressor cell 4, the network element may (if the victim system 1 comprises a plurality of cells) determine S3 that the DL signal strength of signals from at least one neighboring cell 5 comprised in the victim cellular communication system 1 is below a predetermined third threshold Z at the victim radio device 900A. The signal strength from neighboring cell(s) may be measured by or received from the victim radio device which may regularly perform such standard measurements. By this, the network element may exclude that signaling in other cell(s) of the victim system causes the radio interference for the victim radio device, before determining that the interference is from another (aggressor) system 2. In some embodiments, the at least one neighboring cell 5 operates in the same radio frequency channel as the serving cell 3. Alternatively, the at least one neighboring cell 5 operates in a different radio frequency channel than the serving cell 3. Once it has been determined S3 that the interference is from the aggressor system 2, the network element (e.g. a BS 800) may typically apply S5 interference resolution for mitigating the radio interference from the aggressor cell 4, e.g. any of the interference resolution mechanisms I-IV discussed herein, possibly in sequence.

The method steps of the embodiments of the method of the present disclosure may be performed by the network element 800/900 by means of the processor circuitry 804/902 therein executing a computer program 809/906 of the present disclosure.

In some embodiments of the present disclosure, the victim cellular communication system 1 operates in a first radio frequency band F1, and the aggressor cellular communication system 2 operates in a third radio frequency band F3 different from the first radio frequency band. The bands F1 and F3 may be adjacent, increasing the risk of interference there between. Alternatively, the aggressor cellular communication system 2 operates in the same band as the victim system 1 but in a different (e.g. adjacent) frequency channel. Thus, in some embodiments, the aggressor cell 4 operates in a radio frequency channel which is adjacent to a radio frequency channel in which the serving cell 3 operates. In some embodiments, the victim cellular communication system 1 operates in a first radio frequency band F1 and in a second radio frequency band F2, and the aggressor cellular communication system 2 operates in a third radio frequency band F3 different from the first and second radio frequency bands. The bands F1, F2 and F3 may be adjacent, increasing the risk of interference there between. Alternatively, the aggressor cellular communication system 2 operates in one of the two bands (F1 or F2) as the victim system 1 but in a different (e.g. adjacent) frequency channel. Thus, in some embodiments, the aggressor cell 4 operates in a radio frequency channel which is adjacent to a radio frequency channel in which the serving cell 3 operates.

In some embodiments of the present disclosure, the network element is, or is comprised in, the victim radio device 900A. Alternatively, in some other embodiments, the network element is, or is comprised in, a network node of the victim cellular communication system 1, e.g. a base station 800.

The method further comprises an interference resolution S5. The interference resolution may comprise at least one of the following mechanisms:

I. scheduling the victim radio device 900A on resource blocks (RB) other than the RB:s in which the victim radio device experiences the radio interference from the aggressor cell 4;

II. handing over the victim radio device 900A to a neighboring cell 5 comprised in the victim cellular communication system 1 and operating in the same radio frequency channel as the serving cell 3, which neighboring cell is able to schedule the victim radio device on RB:s other than the RB:s in which the victim radio device experiences the radio interference from the aggressor cell 4;

III. handing over the victim radio device 900A to a neighboring cell 5 comprised in the victim cellular communication system 1 and operating in a different radio frequency channel than the serving cell 3, wherein the frequency channel may be in the same or another band;

IV. informing the aggressor cellular communication system 2 about the RB:s in which the victim radio device 900A experiences the radio interference from the aggressor cell 4, thereby allowing the aggressor cellular communication system to act to reduce its interference.

In some embodiments, mechanism I comprises:
determining 200 the RB:s in which the victim radio device 900A experiences the radio interference from the aggressor cell 4.

In some embodiments, mechanism I may further comprise:
determining 210 an area around the victim radio device 900A in which the victim radio device is likely to experience the radio interference from the aggressor cell 4; and
setting 250 a timer for a time period T during which the victim cellular communication system 1 should avoid scheduling any radio device 900 in the determined area on the determined RB:s.

In some embodiments, mechanism II and/or III comprises:
determining 300 that the DL signal strength from the neighboring cell 5 is above a predetermined fourth threshold Q, implying that the neighboring cell 5 can be selected to serve the victim radio device 900A;
sending 310 a message to the selected neighboring cell 5;
obtaining 320, in response to the sent 310 message, an indication that the selected neighboring cell 5 is able to schedule the victim radio device 900A on RB:s other than the RB:s in which the victim radio device experiences the radio interference from the aggressor cell 4; and
handing 330 over the victim radio device 900A to the selected neighboring cell 5.

The fourth threshold Q may in some embodiments be the same as the second threshold Y, since both thresholds are set to determine whether the signal strength from a cell is enough for making it suitable for serving the victim radio device.

In some embodiments of mechanism II, sending 310 a message comprises sending a handover message comprising information about in which RB:s the victim radio device experiences the radio interference from the aggressor cell 4, and the obtaining 320 an indication comprises receiving a handover acknowledgement, or negative acknowledgement, from the selected neighboring cell.

Alternatively, in some embodiments of mechanism II, sending 310 a message comprises sending a request for information about available RB:s of the selected neighboring cell, and obtaining 320 an indication comprises receiving information about which RB:s are available for scheduling by the selected neighboring cell.

Alternatively, in some embodiments of mechanism II, sending 310 a message comprises sending information about in which RB:s the victim radio device experiences the radio interference from the aggressor cell 4, and the obtaining 320 an indication comprises receiving an acknowledgement confirming that the selected neighboring cell is able to schedule the victim radio device on RB:s other than the RB:s on which it experiences the radio interference.

When applying interference resolution S5, the network element may sequentially:
apply mechanism I;
if mechanism I is unsuccessful due to inability to schedule the victim radio device 900A on RB:s other than the RB:s in which the victim radio device experiences the radio interference from the aggressor cell 4, then apply mechanism II and/or III;
if mechanism II and/or III is unsuccessful due to inability to hand over the victim radio device 900A to a neighboring cell 5 in the victim system 1, then apply mechanism IV.

The above sequence may be a convenient order for applying the different mechanisms, since it may e.g. be easier to reschedule the victim radio device in accordance with mechanism I if possible, without having to hand over the radio device. Similarly, it may be easier to hand over the radio device to a neighboring cell 5 within the same victim system 1 in accordance with mechanism II or III than attempt to communicate with the aggressor system 2. However, alternative sequence orders of the mechanisms may be applied.

In some embodiments of the present disclosure, the victim cellular communication system 1 is in accordance with a Long Term Evolution (LTE) radio communication standard. However, in other embodiments, the victim system 1, and possibly also the aggressor system 2, may be in accordance with any other radio communication standard.

In some embodiments of the present disclosure, the DL reception quality is a signal-to-interference ratio (SIR or SINR). SINR is an example of a property of the DL signals in the serving cell which may be suitable for measuring reception quality, but other properties may alternatively or additionally be used.

In some embodiments of the present disclosure, the DL signal strength from the serving cell 3 is a reference signal received power (RSRP). RSRP is an example of a property of the strength of received signals which may be suitable, but other properties may alternatively or additionally be used.

According to another aspect of the present disclosure, there is provided a network element 800/900 for a victim cellular communication system 1 comprising a serving cell 3 serving a victim radio device 900A. The network element comprises means (e.g. the reception quality determining module 1001) for determining S1; 110 that the DL radio signal quality of signals from the serving cell 3 at the victim radio device 900A is below a predetermined first threshold X, implying poor DL radio signal quality. The network element also comprises means (e.g. the serving cell signal strength determining module 1002) for determining S2; 120 that the DL signal strength of signals from the serving cell 3 at the victim radio device 900A is above a predetermined second threshold Y, implying that the poor DL radio signal quality is due to either intra-system interference from DL signaling within said victim system, or to inter-system interference from UL signaling in an aggressor system. If the victim cellular communication system 1 comprises at least one neighboring cell, then the network element may also comprise means (e.g. the neighboring cell signal strength determining module 1003) for determining S3; 140 that the DL signal strength of signals from said at least one neighboring cell 5 is below a predetermined third threshold Z at the victim radio device 900A. The network element also comprises means (e.g. the radio interference determining module 1004) for determining S4; 160 that the poor DL radio signal quality is due to radio interference from UL signaling in an aggressor cell 4 comprised in an aggressor cellular communication system 2. Further, the network element also comprises means (e.g. the interference resolution application module 1005) for applying S5 interference resolution for mitigating the inter-system interference from the aggressor cell 4. The means comprised in the network element mentioned here may e.g. be (or comprise) processor circuitry 804 or 902 comprised in the network element, e.g. a radio device 900 or a BS Boo (e.g. a scheduler comprised therein) executing SW/computer program(s) 809 or 906 forming the functional modules 1001-1005 in said processor circuitry for performing method steps of the present disclosure.

The present invention may be carried out in other ways than those specifically set forth herein without departing from essential characteristics of the invention. The present embodiments are to be considered in all respects as illustrative and not restrictive.

The present disclosure has mainly been described above with reference to a few embodiments. However, as is readily appreciated by a person skilled in the art, other embodiments than the ones disclosed above are equally possible within the scope of the present disclosure, as defined by the appended claims.

The invention claimed is:

1. A method for managing inter-system interference performed by a network element in a victim cellular communication system comprising a serving cell serving a victim radio device, the method comprising:
determining that the downlink (DL) reception quality of signals from the serving cell at the victim radio device is below a predetermined first threshold, implying poor DL radio signal quality;
determining that the DL signal strength of signals from the serving cell at the victim radio device is above a predetermined second threshold, implying that the poor DL radio signal quality is due to either intra-system interference from DL signaling within said victim system, or to inter-system interference from UL signaling in an aggressor system;
if the victim cellular communication system comprises at least one neighboring cell, then determining that the DL signal strength of signals from said at least one neighboring cell is below a predetermined third threshold at the victim radio device;
determining that the poor DL radio signal quality is due to radio interference from uplink (UL) signaling in an aggressor cell comprised in an aggressor cellular communication system; and
applying interference resolution for mitigating the inter-system interference from the aggressor cell.

2. The method of claim 1, wherein the victim cellular communication system comprises at least one neighboring cell, and wherein the at least one neighboring cell operates in the same or different radio frequency channel as the serving cell.

3. The method of claim 1, wherein the victim cellular communication system operates in a first radio frequency band, and the aggressor cellular communication system operates in a third radio frequency band different from the first radio frequency band.

4. The method of claim 1, wherein the victim cellular communication system operates in a first radio frequency band and the victim radio device also supports a second radio frequency band, and the aggressor cellular communication system operates in a third radio frequency band different from the first and second radio frequency bands.

5. The method of claim 1, wherein the aggressor cell operates in a radio frequency channel which is adjacent to a radio frequency channel in which the serving cell operates.

6. The method of claim 1, wherein the network element is, or is comprised in, the victim radio device.

7. The method of claim 1, wherein the network element is, or is comprised in, a network node of the victim cellular communication system.

8. The method of claim 1, wherein the interference resolution comprises at least one of the following mechanisms:
   scheduling the victim radio device on resource blocks (RBs) other than the RBs in which the victim radio device experiences the radio interference from the aggressor cell;
   handing over the victim radio device to a neighboring cell comprised in the victim cellular communication system and operating in the same radio frequency channel as the serving cell, which neighboring cell is able to schedule the victim radio device on RBs other than the RBs in which the victim radio device experiences the radio interference from the aggressor cell;
   handing over the victim radio device to a neighboring cell comprised in the victim cellular communication system and operating in a different radio frequency channel than the serving cell;
   informing the aggressor cellular communication system about the RBs in which the victim radio device experiences the radio interference from the aggressor cell, thereby allowing the aggressor cellular communication system to act to reduce its interference.

9. The method of claim 8, wherein scheduling the victim radio device on resource blocks (RBs) other than the RBs in which the victim radio device experiences the radio interference from the aggressor cell comprises:
   determining the RBs in which the victim radio device experiences the radio interference from the aggressor cell.

10. The method of claim 9, wherein scheduling the victim radio device on resource blocks (RBs) other than the RBs in which the victim radio device experiences the radio interference from the aggressor cell further comprises:
   determining an area around the victim radio device in which the victim radio device is likely to experience the radio interference from the aggressor cell.

11. The method of claim 10, wherein scheduling the victim radio device on resource blocks (RBs) other than the RBs in which the victim radio device experiences the radio interference from the aggressor cell further comprises:
   setting a timer for a time period during which the victim cellular communication system should avoid scheduling any radio device in the determined area on the determined RBs.

12. The method of claim 9, wherein handing over the victim radio device to a neighboring cell and operating in the same radio frequency channel as the serving cell or handing over the victim radio device to a neighboring cell and operating in a different radio frequency channel than the serving cell comprises:
   determining that the DL signal strength from the neighboring cell is above a predetermined fourth threshold, implying that the neighboring cell can be selected to serve the victim radio device;
   sending a message to the selected neighboring cell for coordinating available RBs of the selected neighboring cell for scheduling the victim radio device;
   obtaining, in response to the sent message, an indication that the selected neighboring cell is able to schedule the victim radio device on RBs other than the RBs in which the victim radio device experiences the radio interference from the aggressor cell; and
   handing over the victim radio device to the selected neighboring cell.

13. The method of claim 12, wherein the sending the message to the selected neighboring cell comprises sending a handover message comprising information about in which RBs the victim radio device experiences the radio interference from the aggressor cell, and wherein the obtaining an indication comprises receiving a handover acknowledgement from the selected neighboring cell.

14. The method of claim 12, wherein the sending the message to the selected neighboring cell comprises sending a request for information about available RBs of the selected neighboring cell, and wherein the obtaining an indication comprises receiving information about which RBs are available for scheduling by the selected neighboring cell.

15. The method of claim 12, wherein the sending a message the message to the selected neighboring cell comprises sending information about in which RBs the victim radio device experiences the radio interference from the aggressor cell, and wherein the obtaining an indication comprises receiving an acknowledgement confirming that the selected neighboring cell is able to schedule the victim radio device on RBs other than the RBs on which it experiences the radio interference.

16. The method of claim 8, wherein the network element, when applying the interference resolution, sequentially:
   schedules the victim radio device on RBS other than the RBs in which the victim radio device experiences the radio interference from the aggressor cell;
   if scheduling the victim radio device on RBs other than the RBS in which the victim radio device experiences the radio interference from the aggressor cell is unsuccessful, due to inability to schedule the victim radio device on RBs other than the RBs in which the victim radio device experiences the radio interference from the aggressor cell, then applies said handing over the victim radio device to a neighboring cell comprised in the victim cellular communication system and operating in the same radio frequency channel as the serving cell or said handing over the victim radio device to a neighboring cell comprised in the victim cellular communication system and operating in a different radio frequency channel than the serving cell;
   if handing over the victim radio device is unsuccessful due to inability to hand over the victim radio device to a neighboring cell in the victim system, then informs the aggressor cellular communication system about the RBs in which the victim radio device experiences the radio interference from the aggressor cell.

17. The method of claim 1, wherein the victim cellular communication system is in accordance with a Long Term Evolution (LTE) radio communication standard.

18. The method of claim 1, wherein the DL reception quality is a signal-to-interference ratio.

19. The method of claim 1, wherein the DL signal strength from the serving cell is a reference signal received power (RSRP).

20. A network element for a victim cellular communication system comprising a serving cell serving a victim radio device, the network element comprising:
 a processor and a memory operatively coupled to the processor and storing instructions for execution by the processor, whereby the processor is operative to:
  determine that the downlink (DL) reception quality of signals from the serving cell at the victim radio device is below a predetermined first threshold, implying poor DL radio signal quality;
  determine that the DL signal strength of signals from the serving cell at the victim radio device is above a predetermined second threshold, implying that the poor DL radio signal quality is due to either intra-system interference from DL signaling within said victim system, or to inter-system interference from UL signaling in an aggressor system;
  if the victim cellular communication system comprises at least one neighboring cell, then determine that the DL signal strength of signals from said at least one neighboring cell is below a predetermined third threshold at the victim radio device;
  determine that the poor DL radio signal quality is due to radio interference from uplink (UL) signaling in an aggressor cell comprised in an aggressor cellular communication system; and
  apply interference resolution for mitigating the inter-system interference from the aggressor cell.

21. A radio device comprising the network element of claim 20.

22. A base station comprising the network element of claim 20.

23. A non-transitory computer-readable medium comprising, stored thereupon, a computer program for a network element in a victim cellular communication system comprising a serving cell serving a victim radio device, the computer program comprising computer program code that is configured to, when run on processor circuitry of the network element, cause the network element to:
 determine that the downlink (DL) reception quality of signals from the serving cell at the victim radio device is below a predetermined first threshold, implying poor DL radio signal quality;
 determine that the DL signal strength of signals from the serving cell at the victim radio device is above a predetermined second threshold, implying that the poor DL radio signal quality is due to either intra-system interference from DL signaling within said victim system, or to inter-system interference from UL signaling in an aggressor system;
 if the victim cellular communication system comprises at least one neighboring cell, then determine that the DL signal strength of signals from said at least one neighboring cell is below a predetermined third threshold at the victim radio device;
 determine that the poor DL radio signal quality is due to radio interference from uplink (UL) signaling in an aggressor cell comprised in an aggressor cellular communication system; and
 apply interference resolution for mitigating the inter-system interference from the aggressor cell.

* * * * *